United States Patent
Meyer

(10) Patent No.: US 6,338,376 B1
(45) Date of Patent: Jan. 15, 2002

(54) APPARATUS FOR TRANSVERSELY WELDING PLASTIC WEBS

(75) Inventor: Armin Meyer, Köln (DE)

(73) Assignee: Lemo Maschinenbau GmbH, Niederkassel-Mondorf (DE)

( * ) Notice: Subject to any disclaimer, the term of this patent is extended or adjusted under 35 U.S.C. 154(b) by 0 days.

(21) Appl. No.: 09/520,122

(22) Filed: Mar. 7, 2000

(51) Int. Cl.⁷ ............................. B32B 31/00
(52) U.S. Cl. ............... 156/553; 156/582; 100/156; 492/39
(58) Field of Search ............... 156/553, 555, 156/580, 581, 582, 583.1, 583.4; 492/39; 100/156

(56) References Cited

U.S. PATENT DOCUMENTS

| 4,870,731 A | * | 10/1989 | Yano | 29/116.1 |
| 4,954,204 A | * | 9/1990 | Grimshaw | 156/361 |
| 5,011,563 A | * | 4/1991 | Shinno et al. | 156/574 |
| 5,176,785 A | * | 1/1993 | Poyet et al. | 156/574 |
| 5,637,177 A | * | 6/1997 | Os | 156/286 |

* cited by examiner

*Primary Examiner*—James Sells
(74) *Attorney, Agent, or Firm*—Herbert Dubno

(57) ABSTRACT

A device for the transverse welding of plastic webs to produce bags and the like has a welding beam with a rounded edge turned toward the web juxtaposed with a welding roller which can have a plurality of rings mounted thereon to advance the weld seam length or transverse the welding width the rings can be coated with polytetrafluoroethylene and adjustment of the device to greater or reduced welding widths is accomplished by adding or subtracting the rings which are contiguous with one another.

12 Claims, 3 Drawing Sheets

APPARATUS FOR TRANSVERSELY WELDING PLASTIC WEBS

FIELD OF THE INVENTION

The present invention relates to an apparatus for the transverse welding, especially of synthetic resin webs for the manufacture of plastic bags, sacks or the like. More particularly the invention relates to a device for forming weld seams in webs of plastic foil or film transversely to a direction of advance of the web and having a first welding beam movable back and forth and formed with a rounded welding edge turned toward the web and a second welding beam cooperating therewith and formed on a weld roller.

BACKGROUND OF THE INVENTION

In the manufacture of plastic bags, sacks or the like, a synthetic resin web, e.g. of blown film or foil, having a fold along one or both longitudinal edges is generally advanced along a path at which transverse weld seams are formed between the layers of the web to separate the web into bags and to form the seams in the bags thus produced.

The first welding beam is generally provided above the foil and can be moved up and down away from and toward the web and, of course, the welding roller which forms the second beam and underlies the web. The welding roller usually has a jacket of rubber or the like.

The welding roller extends the full width of the web and it is also customary for the first welding beam provided with the aforementioned edge to extend the full length of the welding roller. In practice, however, the transverse beam which must be formed by the edge of the first beam is frequently less than the full length of the first beam and of the welding roller. It has been found that when the web is narrower than the length of the welding edge and the welding roller, significant wear occurs at the portion of the welding edge beyond the web and on the welding roller beyond the web as well. When the welding roller is coated as polytetrafluoroethylene, moreover, in the region in which the welding edge may contact this coating without an intervening synthetic resin web, wear of the coating is relatively rapid.

Uncontrollable wear and reshaping of the edge of the first welding beam and damage to the coating or jacket of the welding roller interact to promote further rapid deterioration of the welding tools. For example, uncontrolled wear of the welding edge can promote or induce additional wear of the welding roller. When, therefore, a wider web is to be used and the seam is to be formed utilizing parts of the welding edge of the welding roller which have previously been excessively worn because of the lack of a web between these parts, the weld seam can be unsatisfactory and can even cause rejection of the bags which are produced.

It is, therefore, generally the practice to change one or more of the weld beams upon changing of the width of the web to be used. As a consequence, the weld beams are frequently replaced at high cost. The replacement of the roller, for example, means that it frequently must be recoated as with the comparatively extensive material, polytetrafluoroethylene, even if it has a rubber jacket.

OBJECTS OF THE INVENTION

It is, therefore, the principal object of the present invention to provide an improved apparatus or device for the purposes described which, in a simple manner, can prevent premature wear of the welding tools and nevertheless can permit rapid matching of the welding tools to the width of the synthetic resin web which is to be seamed.

Another object is to obviate the drawbacks of earlier systems as described.

SUMMARY OF THE INVENTION

These objects are attained, in accordance with the invention, in a device for the transverse welding of synthetic resin webs for producing bags, sacks and the like, comprising a first welding beam formed with a rounded welding edge turned toward the web and a second welding beam juxtaposed with the edge and formed as a welding roller having a cylindrical carrier body extending over at least a maximum length ($L_{max}$) of a weld seam to be formed transversely of the web, and a plurality of elements mountable on the carrier body in an axially abutting, contiguous and gap-free assembly forming a substantially continuous surface over a length (L) of a weld seam less than the maximum length.

Thus, according to the invention, the second welding beam, at least over a length corresponding to the maximum length of a weld seam to be formed in the synthetic resin web, comprises a cylindrical carrier body with a plurality of elements mounted thereon in a gapless, end-to-end manner forming the surface juxtaposed with the welding edge over the length of the welding seam which is to be formed. These elements are concentrically arranged and are directly or indirectly connectable individually or collectively to the carrier body and to the welding roller. The elements can be rings fitted over the roller tube which then forms the carrier body and the rings can be either of equal width or can comprise a base ring having a length equal to the minimum length of weld seams to be formed and adjoined by one or more additional rings which themselves can be of equal or unequal width.

The system of the invention provides a simple way of adjusting welding width to the particular web beam used without the danger that either the welding edge or the coating on the welding roller will be adversely affected by the lack of a foil web between them.

To prevent tilting of the upper welding beam, in a region corresponding to the maximum welding width, a support ring can be mounted on the carrier body and can be continuously affixed through this support. The ring can be provided at an end of the carrier body opposite the end at which the base ring is provided.

The rings which are mounted on the carrier body can have rubber jackets and can be provided on their outer peripheries with a low friction coating of a synthetic resin, especially polytetrafluoroethylene.

BRIEF DESCRIPTION OF THE DRAWING

The above and other objects, features, and advantages will become more readily apparent from the following description, reference being made to the accompanying drawing in which.

SPECIFIC DESCRIPTION

Figure 4:
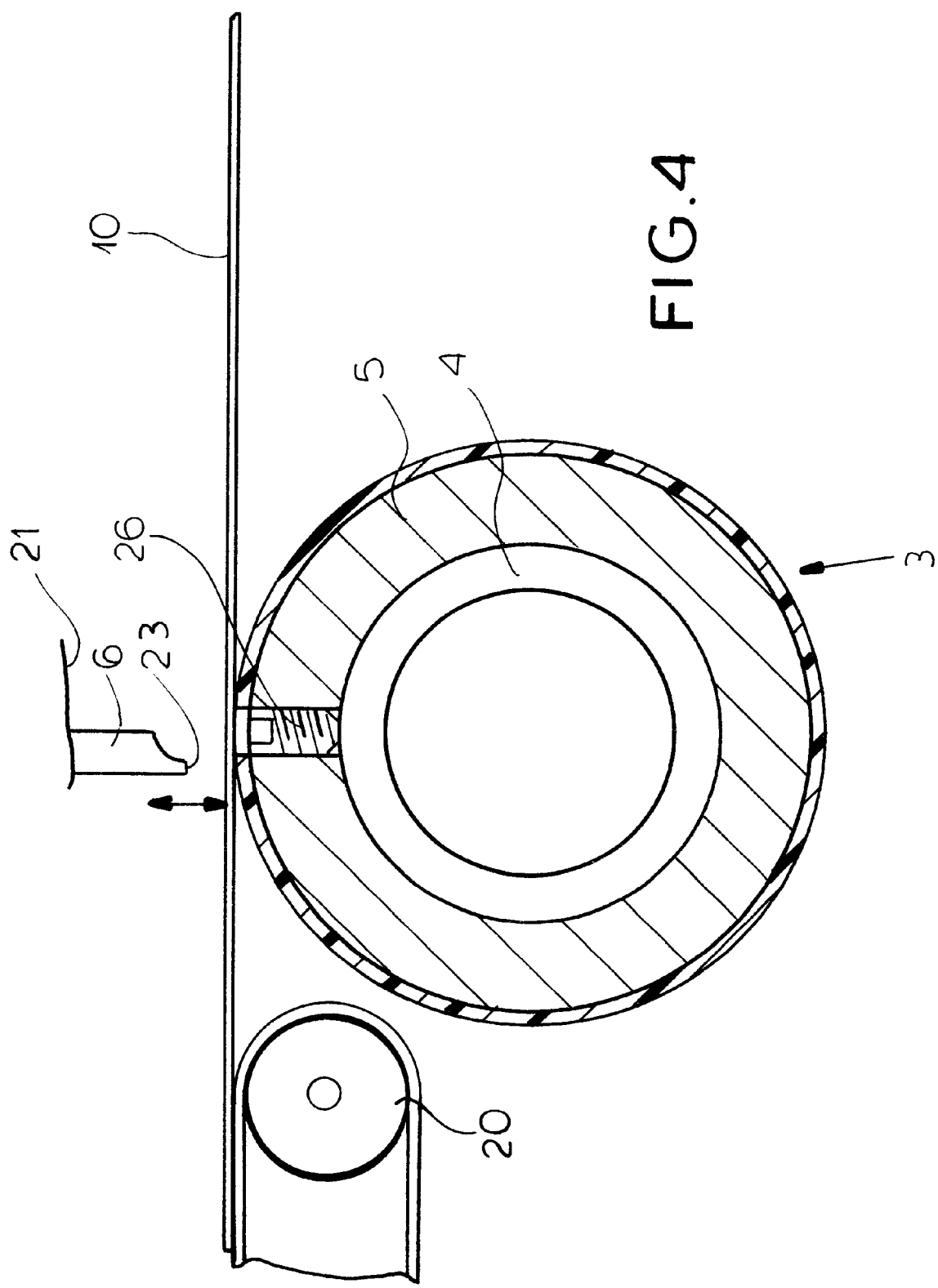
FIG. 4 is a transverse section through the assembly.

A bag-making machine, represented in FIG. 4 by the conveyor 20 which advances a synthetic resin foil web 10 through the system for forming longer seams, punching cutouts and the like and for stacking and, if desired, padding the bags produced, comprises a welding tool 1 which has an upper vertically-displaceable welding beam 2 and a lower welding beam formed by a welding roller 3 cooperating with the welding beam 2. The welding beam 2 comprises, in turn, a bar 21 extending the full length of the welding tool and hence the full width of the apparatus and a piece 6 formed with an edge 23 turned toward the roller 3 and having a convex curvature in that direction. The web 10 passes between this edge 23 and the periphery of the welding roller 3. The vertical displacement of the beam 2 toward and away from the roller 1 is represented by the double-headed arrow 22.

The welding roller 3 is comprised of a roller tube 4 and an array of rings 5 fitted onto the tube 4 and in an end-to-end contacting or contiguous relationship so that the rings directly adjoin one another in a gapless manner.

Figure 3:
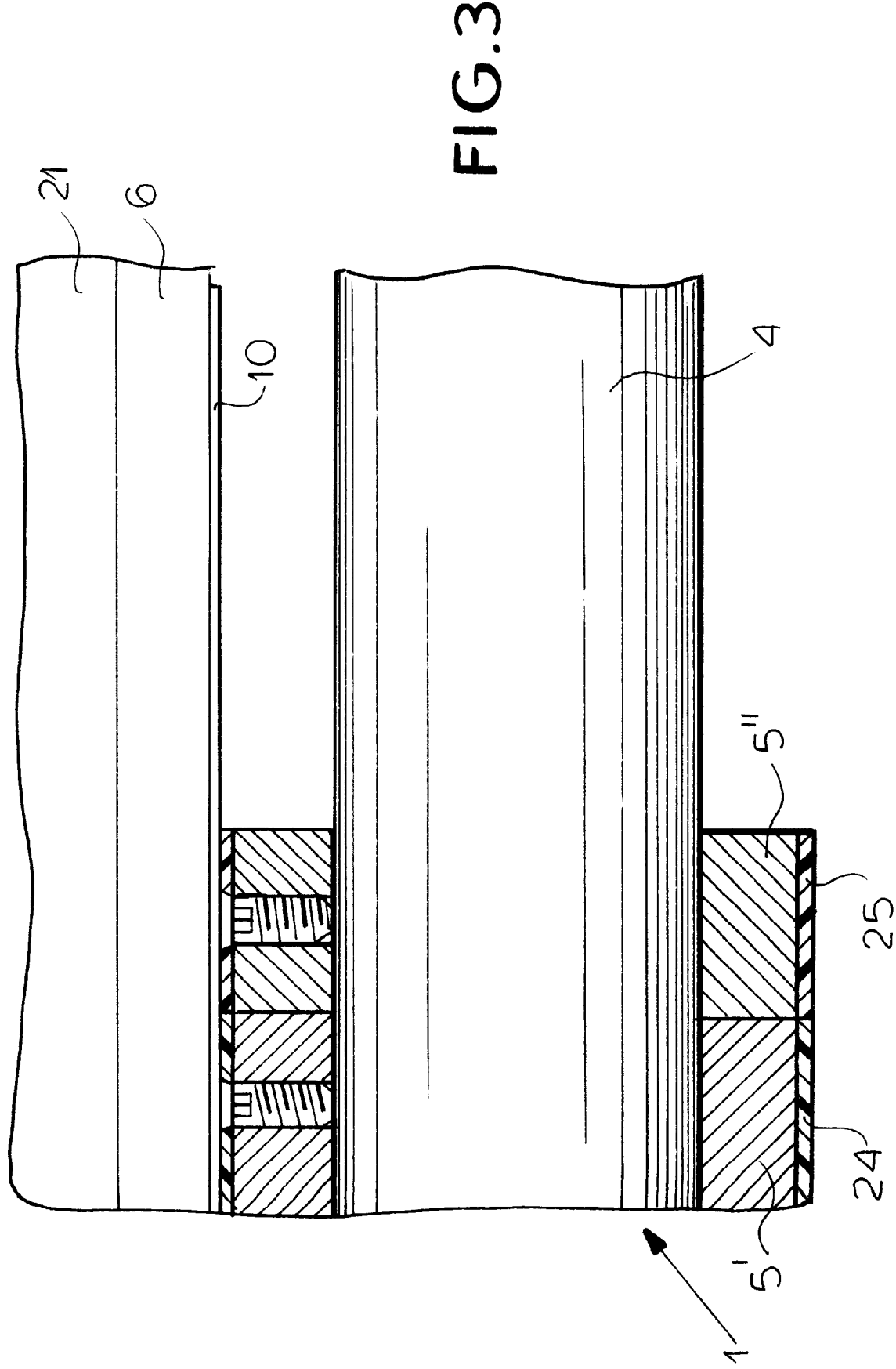
FIG. 3 is a detail section through the ring of the lower beam.

A base ring 5' is here provided with a length L which can be the minimum length of the weld seam to be formed and the narrowest web 10 is passed between the weld beam 2 and the roller 3. The ring 5' is coated with polytetrafluoroethylene as shown at 24. Where the maximum seam length is represented at $L_{MAX}$ and the actual seam length to be fabricated is represented at L, there is a region between the end of the ring 5' and the opposite end of the roller 4 in which the edge 22 of the piece 6 does not come into contact with the roller 4. When the actual seam length is greater than L, for example L1, a further ring 5" is added whose width V corresponds to the difference between the lengths L1 and L. This additional ring 5" is also provided with a polytetrafluoroethylene coating 25 (FIG. 3). It is thus apparent that depending upon the actual length of the seam, a plurality of rings 5', 5" may be arrayed in a contiguous and gapless manner with contiguous surfaces and concentric to the axis of the roller 4 to support the web only in the regions in which the weld seam is to be formed.

Figure 2:
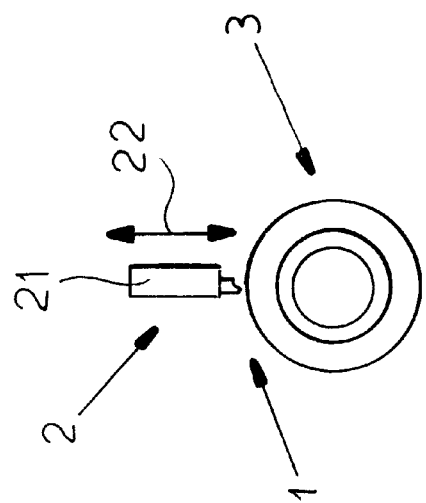
FIG. 2 is an end view of the pair of tools.
Figure 1:
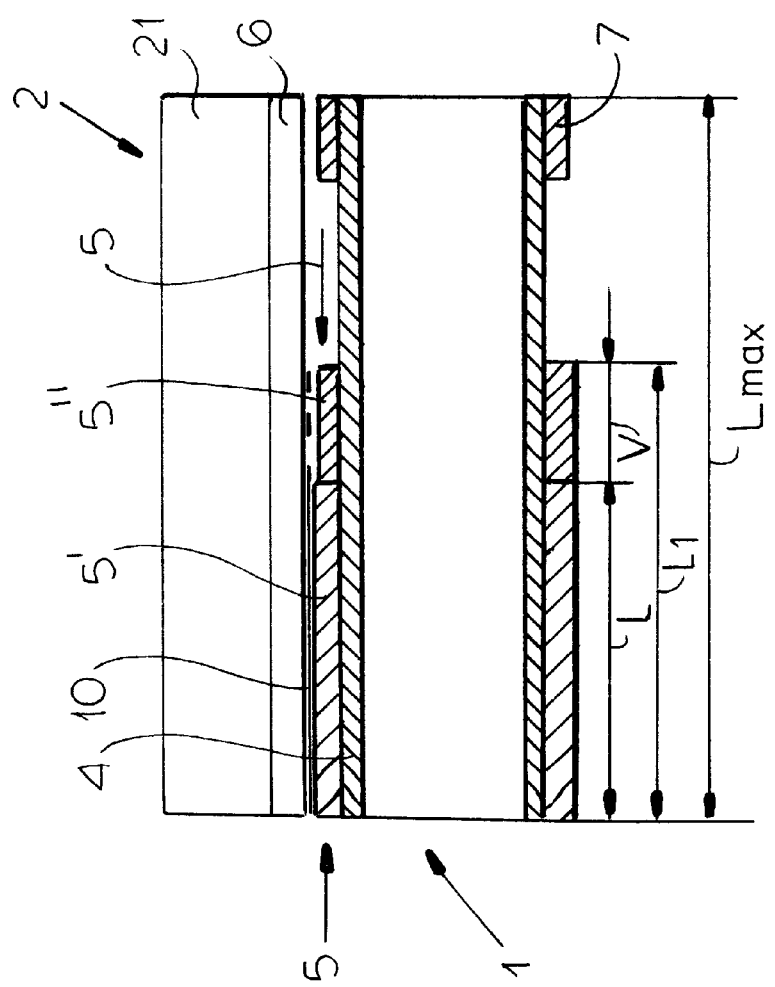
FIG. 1 is a diagrammatic axial section of a pair of welding tools in a bag making the apparatus diagrammatically illustrating the invention.

The rings 5', 5" may be of equal width (FIG. 3) or of different widths (FIG. 1) as measured along the roller 4 and transversely of the feed of the web. The base ring 5' can be formed from a number of rings 5" or adjacent the base ring 5', a plurality of additional rings 5" of equal or different widths may be mounted on the roller 4 to make up the seam length or welding width.

The replacement of the welding roller is not required since matching of the system to the respective welding width is accomplished only by removing or adding rings in accordance with need. The rings are held together or individually to the roller 4 via set screws 26 or clip rings or the like and the means for holding the rings on the roller 4 may be individual to the rings or for a plurality of rings.

I claim:

1. A device for the transverse welding of synthetic resin webs for producing bags, sacks and the like, comprising a first welding beam formed with a rounded welding edge turned toward the web and a second welding beam juxtaposed with said edge and formed as a welding roller having a cylindrical carrier body extending over at least a maximum length ($L_{max}$) of a weld seam to be formed transversely of the web, and a plurality of elements mountable on said carrier body in an axially abutting, contiguous and gap-free assembly forming a substantially continuous surface over a length (L) of a weld seam less than said maximum length.

2. The device defined in claim 1 wherein said carrier body is a roller tube and said elements are contiguous rings coaxial with said tubs and flush with one another, said device further comprising means for affixing said rings to said tube.

3. The device defined in claim 2 wherein said means affixes said rings directly to said tube.

4. The device defined in claim 2 wherein said means affixes said rings indirectly to said tube.

5. The device defined in claim 2 wherein said means affixes said rings individually to said tube.

6. The device defined in claim 2 wherein said means affixes said rings collectively to said tube.

7. The device defined in claim 2 wherein said rings are of equal width.

8. The device defined in claim 2 wherein said rings include at least one ring having a length corresponding to a minimum length of a weld seam to be formed in a web by said device, and at least one additional ring contiguous with said one ring.

9. The device defined in claim 8 wherein a plurality of said additional rings are provided and said additional rings are of equal widths.

10. The device defined in claim 8 wherein a plurality of said additional rings are provided and said additional rings are of unequal widths.

11. The device defined in claim 2, further comprising a support ring fitted onto said carrier body in a region of the maximum length ($L_{max}$) and permanently mounted on said body to support said edge beyond said assembly.

12. The device defined in claim 2 wherein said rings are provided with low-friction plastic coatings along outer peripheries thereof.

* * * * *